United States Patent [19]

Bailey et al.

[11] Patent Number: 5,142,271
[45] Date of Patent: Aug. 25, 1992

[54] FLUID FLOW SENSOR

[75] Inventors: David F. Bailey; William H. Morrison, Jr., both of Hillsborough County, Fla.

[73] Assignee: Hollister, Inc., Libertyville, Ill.

[21] Appl. No.: 794,307

[22] Filed: Nov. 14, 1991

Related U.S. Application Data

[63] Continuation of Ser. No. 479,657, Feb. 8, 1990, abandoned.

[51] Int. Cl.$^5$ ............................................. G08B 21/00
[52] U.S. Cl. .................... 340/606; 340/611; 73/861.56; 73/861.57; 200/81.9 R; 200/84 R; 200/82 R
[58] Field of Search ............... 340/606, 611, 619; 73/861.56, 861.57, 861.58; 200/84 B, 82 B, 82 DA, 82 E, 82 C, 81.9 R, 82 R, 84 R

[56] References Cited

U.S. PATENT DOCUMENTS

| 3,673,863 | 7/1972 | Spacek | 73/861.56 |
| 4,003,255 | 1/1977 | Spencer | 73/861.71 |
| 4,486,744 | 12/1984 | Pratt et al. | 340/606 |
| 4,763,114 | 8/1988 | Eidsmore | 340/606 |

FOREIGN PATENT DOCUMENTS 0808963  3/1969  Canada .................. 340/606

Primary Examiner—Edward L. Coles, Sr.
Assistant Examiner—Jill Jackson
Attorney, Agent, or Firm—Arthur W. Fisher, III

[57] ABSTRACT

A fluid flow sensor for use with a fluid circulating system to indicate a predetermined rate of fluid flow therethrough, fluid flow sensor comprises a hollow fluid flow sensor body including a lower flow detection chamber and an upper fluid flow chamber formed therein and a float movable between a lower and upper position disposed within the hollow fluid flow sensor body, a float position sensing device including logic circuitry to selectively generate a first and second signal disposed adjacent the lower portion of the lower flow detection chamber and a float limit disposed within the upper fluid flow chamber, the float being disposed adjacent the float position sensing device when in the first position when fluid flow through the fluid flow sensor is less than the predetermined rate of fluid flow whereby the float position sensing device generates the first signal to indicate fluid flow of less than the predetermined rate and when the fluid flow through the fluid flow sensor equals or exceeds the predetermined rate of fluid flow through the fluid flow sensor the float moves to the second position to engage the float limit disposed within the upper fluid flow chamber permitting unrestricted flow of fluid through the fluid flow sensor and the float position sensing device generates the second signal to indicate fluid flow equal to or greater than the predetermined rate of fluid flow.

4 Claims, 2 Drawing Sheets

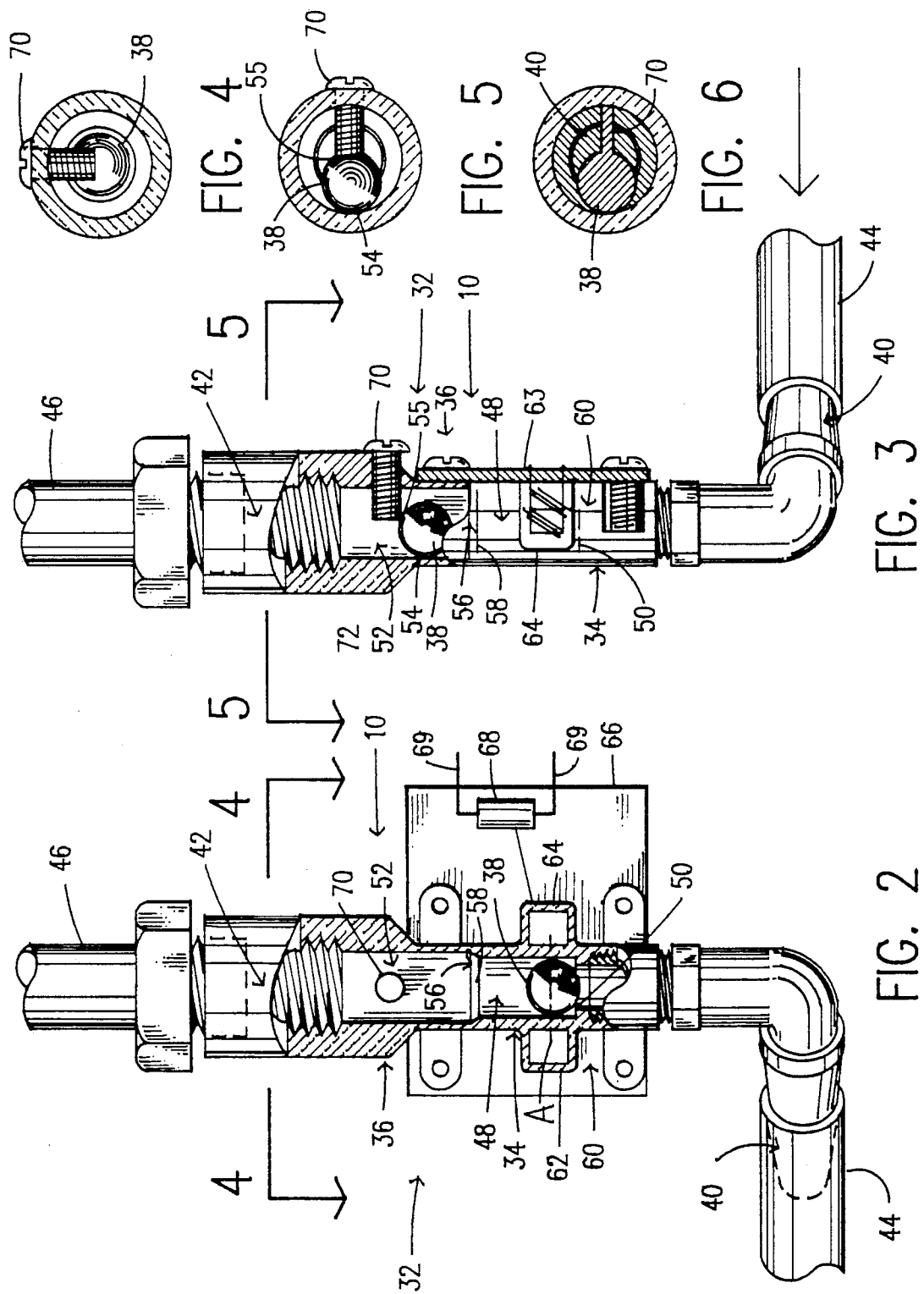

FLUID FLOW SENSOR

Co-pending Application

This application is a continuation application of pending application Ser. No. 479,657, filed Feb. 8, 1990 now abandoned.

BACKGROUND OF THE INVENTION

1. Field of The Invention

A fluid flow sensor for use with a fluid circulating system to indicate a predetermined rate of fluid flow therethrough.

2. Description of The Prior Art

Fluid flow meters and fluid flow sensors are well known in the art. Commonly such meters and sensors include relatively expensive or complex mechanical and/or electronic systems that are often relatively insensitive to small fluctuations of fluid flow.

U.S. No. 4,550,314 discloses a fluid flow meter having an output level limit monitoring means adapted to detect movement of a mechanical pointer. A light emitting diode and photoresistor cooperatively indicate movement of the mechanical pointer in response to fluid flow through the fluid flow meter.

Additional examples of the prior art are shown in: U.S. No. 1,967,081; U.S. No. 3,150,360; U.S. No. 3,635,678; U.S. No. 3,699,560 and U.S. No. 4,646,796.

SUMMARY OF THE INVENTION

The present invention relates to a fluid flow sensor for use with a fluid circulating system similar to the temperature control fluid circulating system disclosed in U.S. No. 4,459,468. More specifically, the fluid circulating system comprises a fluid reservoir coupled to a magnetically coupled centrifugal pump and a thermal blanket to selectively circulate fluid to and from the thermal blanket or similar remote liquid circulating manifold. The operation of one or more thermal modules, disposed in thermal transfer relationship with the fluid reservoir, is controlled by a microcomputer and display/control module. The fluid circulating system further includes a remote temperature sensor, fluid flow control device, system warning indicator and power supply.

The fluid flow sensor comprises a hollow fluid flow sensor body including a lower flow detection chamber having a lower float seat formed in the lower portion thereof and an upper fluid flow chamber having a float limit disposed therein. A float is movably disposed within the hollow fluid flow sensor body. The fluid flow sensor further includes an liquid inlet and liquid outlet coupled to the outlet side of the thermal blanket by a first fluid conduit and the liquid inlet side of the fluid reservoir by a second fluid conduit respectively.

A float position sensing device is disposed adjacent the lower float seat. The float position sensing device comprises a first and second sensing element electrically coupled to a printed circuit board including logic circuitry to selectively generate a first and second signal as described more fully hereinafter.

In operation, the float in the first position, is initially seated on the lower float seat blocking an energy beam directed from the first sensing element toward the second sensing element. In this configuration, the float position sensing device generates the first signal indicating fluid flow of less than the predetermined rate of fluid flow.

When the rate of fluid flow entering the hollow fluid flow sensor body equals or exceeds the predetermined rate of fluid flow, the float moves upward such that the float no longer obstructs the energy beam. In this configuration, the float position sensing device generates the second signal indicating a flow rate equal to or greater than the predetermined rate of fluid flow through the fluid flow sensor.

The upward movement of the float to the second position as the float enters the upper fluid flow chamber is limited by the float limit.

When the rate of fluid flow through the fluid flow sensor drops below the predetermined rate of fluid flow, the float will move downward to again seat on the lower float seat.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 2 is a detailed front view of the fluid flow sensor with no fluid flow therethrough.

FIG. 3 is a detailed side view of the fluid flow sensor with fluid flow therethrough.

FIG. 4 is a partial top view of the fluid flow sensor with no fluid flow therethrough taken along line 4—4 of FIG. 2.

FIG. 5 is a partial top view of the fluid flow sensor with fluid flow therethrough taken along line 5—5 of FIG. 3.

FIG. 6 is a top view of the effective flow area in the upper fluid flow chamber.

Similar reference characters refer to similar parts throughout the several views of the drawings.

DETAILED DESCRIPTION OF THE PREFERRED EMBODIMENT

Figure 1:
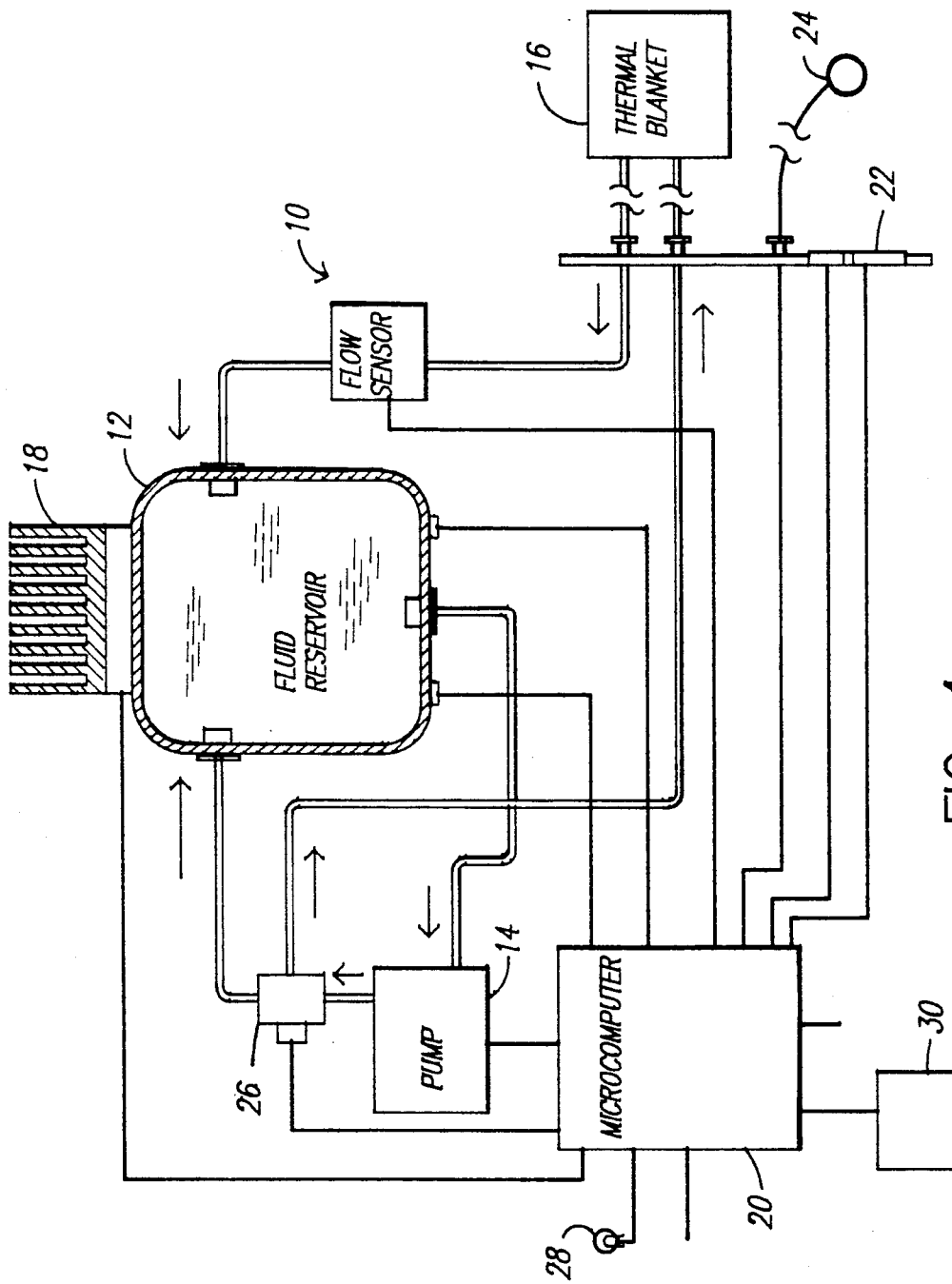
FIG. 1 is a schematic view of a fluid circulating system including the fluid flow sensor of the present invention.

The present invention relates to a fluid flow sensor generally indicated as 10 for use with a fluid circulating system similar to the temperature control fluid circulating system disclosed in U.S. No. 4,459,468.

More specifically, the fluid circulating system comprises a fluid reservoir 12 coupled to a magnetically coupled centrifugal pump 14 and from the thermal blanket 16 or similar remote liquid circulating manifold. The operation of one or more thermal modules 18, disposed in thermal transfer relationship with the fluid reservoir 12, is controlled by a microcomputer 20 and display/control module 22. The fluid circulating system further includes a remote temperature sensor 24, fluid flow control device 26, system warning indicator 28 and power supply 30.

As best shown in FIGS. 2 and 3, the fluid flow sensor 10 comprises a hollow fluid flow sensor body generally indicated as 32 including a substantially vertical lower flow detection chamber generally indicated as 34 and a substantially vertical upper fluid flow chamber generally indicated as 36 formed therein. A spherical float 38 is movably disposed within the hollow fluid flow sensor body 32. The fluid flow sensor 10 further includes a substantially circular liquid inlet 40 and liquid outlet 42 coupled to the outlet side of the thermal blanket 16 by a first fluid conduit 44 and the liquid inlet side of the fluid reservoir 12 by a second fluid conduit 46 respectively.

As best shown in FIGS. 2 and 3, the substantially vertical lower flow detection chamber 34 comprises a substantially cylindrical flow detection channel 48 having a lower float seat 50 formed in the lower portion thereof.

As best shown in FIGS. 2 and 3, the upper fluid flow chamber 36 comprises a substantially cylindrical fluid flow channel 52 having a upper float seat including a first and second contact point indicated as 54 and 55 respectively disposed therein. A fluid flow transition zone 56 formed by a conical surface 58 is disposed between the substantially cylindrical flow detection channel 48 the and fluid substantially cylindrical flow channel 52.

As best shown in FIGS. 2 and 3, a float position sensing device generally indicated as 60 is disposed adjacent the lower float seat 50. The float position sensing device 60 comprises a first and second sensing element indicated as 62 and 64 respectively electrically coupled to a printed circuit board 66 including logic circuitry or LC 68 coupled to an external indicator by conductors 69 to selectively generate a first and second signal as more fully hereinafter. The first and second sensing elements 62 and 64 may comprise a light emitting diode and photo sensor combination or other state of the art sensing device capable of generating a line of sight energy beam indicated as A in FIG. 2 and sensing the presence of the energy beam when uninterrupted.

In order to provide an accurate measure and indication of fluid flow through the fluid flow sensor 10 at a predetermined rate such as 2.5 gallons per hour overcoming hystersis and minimizing turbulence within the fluid flow sensor 10 is important. This is accomplished, in part, by the relative sizes and dimensions of the individual structural elements. Specifically, the diameter of the spherical float 38 is 0.375 inches; while the inside diameter of the liquid inlet 40 and the flow detection channel 48 are 0.19 inches and 0.404 inches respectively. The inside diameter of the fluid flow channel 52 is 0.4375 inches. Thus the cross-sectional area of the substantially cylindrical fluid flow channel 52, less the sum of the horizontal cross-sectional areas of the spherical float 38 and the float limit 70 is substantially the cross-sectional area of the substantially cylindrical liquid inlet 40 as shown in FIG. 6. The effective fluid flow area indicated by the cross-hatching through the substantially cylindrical fluid flow channel 52 with the spherical float 38 and float limit 70 therein is substantially equal to the cross- sectional area of the substantially circular liquid inlet 40.

As best shown in FIGS. 2 and 3, the vertical dimension or length of the lower float seat 50 and the substantially cylindrical fluid flow channel 52 is substantially twice the diameter of the spherical float 38. In addition, the distance between the second contact point 55 and the lowest portion of the substantially cylindrical flow 52 is at least equal to the diameter of the spherical float 38.

As shown in FIGS. 3 through 5, the second contact point 55 formed on the float limit 70 is spaced inwardly from the first contact point 54 on the inner surface 72 of the substantially cylindrical channel fluid flow 52 at least one-half the diameter the spherical float 38 but less than the diameter of the spherical float 38 such that the spherical float 38 will seat between the first and second contact points 54 and 54 when in the second position within the substantially cylindrical fluid flow channel 52. As best shown in FIG. 6, the first and second contact points 54 and 55 are disposed in the same vertical plane.

The specific gravity of the spherical float 38 must be greater than the fluid specific gravity of the liquid.

The float weight must be less than the vertical force applied by the fluid pressure at the 2.5 gallon per hour flow rate. The vertical force is due to the pressure exerted by the fluid flow less the losses due to fluid passing between the spherical float 38 and the substantially cylindrical detection channel 48.

In operation, the spherical float 38 in the first position is initially seated on the lower float seat 50 blocking the energy beam A between the first and second sensing elements 62 and 64. In this configuration, the float position sensing device 60 generates the first signal indicating flow of less than the predetermined rate of fluid flow or 2.5 gallons per hour. As fluid enters the substantially vertical lower flow detection chamber 34, the fluid develops a force on the spherical float 38 due to the flow rate. This force is regulated by the relationship between the spherical float 36 diameter and the cross-sectional area of the substantially cylindrical flow detection channel 48.

At a fluid flow rate of substantially 2.5 gallons per hour, the force overcomes the weight of the spherical float 36, lifting the spherical float 38 within substantially cylindrical the flow detector channel 48 such that the energy beam A is no long obstructed. In this configuration, the float position sensing device 60 generates the second signal indicating a flow rate equal to or greater than the predetermined rate of fluid flow or 2.5 gallons per hour.

The upward movement of the spherical float 38 as the spherical float 38 moves through the substantially cylindrical fluid flow channel 52 to the second position is limited by the float limit 70.

When the rate of fluid flow through the hollow fluid flow sensor body 32 drops below the predetermined rate of fluid flow, the spherical float 38 will move downward to again seat on the lower float seat 50.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A fluid flow sensor for use with a fluid circulating system to indicate a first predetermined rate of fluid flow therethrough, said fluid flow sensor comprises a hollow fluid flow sensor body including a substantially vertical lower flow detection chamber having a liquid inlet formed in the lower portion thereof and a substantially vertical upper fluid flow chamber having a liquid outlet formed in the upper portion thereof, a spherical float movably disposed within said hollow fluid flow sensor body, said lower flow detection chamber comprises a flow detection channel having a lower float seat formed in the lower portion thereof to selectively support said spherical float when the fluid flow through said substantially vertical lower flow detection chamber when less than the first predetermined flow rate and said supper fluid flow chamber comprises a fluid flow channel having an upper float seat comprising a first and second contact point disposed therein to engage said spherical float when the fluid flow through said fluid flow sensor equals or exceeds a second predetermined flow rate, said second contact point being formed on a float limit extending into said hollow fluid flow sensor body, said first contact joint being disposed below and opposite said second contact point on the inner surface of said hollow fluid sensor body such that the center of said spherical float is offset laterally in the vertical plane relative to the longitudinal center line of said fluid flow channel when engaging said first and second contact points.

2. The fluid flow sensor of claim 1 wherein the diameter between said first contact point and said second contact point is at least one-half the diameter of said float and less than one diameter of said float.

3. The fluid flow sensor of claim 1 wherein said first contact point and said second contact point are disposed in the same vertical plane.

4. The fluid flow sensor of claim 1 wherein the effective fluid flow are through said fluid flow channel is the cross-sectional area of the fluid flow channel less the sum of the horizontal cross-sectional areas of said float and said float limit is substantially the cross-sectional area of said liquid inlet.

* * * * *